(12) United States Patent
Barger et al.

(10) Patent No.: US 11,912,396 B2
(45) Date of Patent: Feb. 27, 2024

(54) AXIAL LOAD CAPABLE TORQUE TUBE ASSEMBLY AND MANUFACTURING METHODS THEREOF

(71) Applicant: Hamilton Sundstrand Corporation, Charlotte, NC (US)

(72) Inventors: Victor Barger, Lake in the Hills, IL (US); Joseph M. Bielefeldt, Rockford, IL (US); Jude C. Lai, Rockford, IL (US); Eric W. Karlen, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 691 days.

(21) Appl. No.: 17/075,933

(22) Filed: Oct. 21, 2020

(65) Prior Publication Data

US 2021/0147067 A1 May 20, 2021

Related U.S. Application Data

(60) Provisional application No. 62/935,903, filed on Nov. 15, 2019.

(51) Int. Cl.
*B64C 13/28* (2006.01)
*B21D 39/04* (2006.01)
*F16D 1/10* (2006.01)

(52) U.S. Cl.
CPC .............. *B64C 13/28* (2013.01); *B21D 39/04* (2013.01); *F16C 2326/43* (2013.01); *F16D 1/10* (2013.01);
(Continued)

(58) Field of Classification Search
CPC ..... B64C 13/28; B21D 39/04; F16C 2326/43; F16D 1/10; F16D 2001/103; F16D 2500/5116; F16L 2201/10
See application file for complete search history.

(56) References Cited

U.S. PATENT DOCUMENTS 3,633,951 A * 1/1972 Hinkle ................... F16B 17/004
    29/516
4,561,799 A * 12/1985 Arena ..................... B21D 26/14
    403/375
(Continued)

FOREIGN PATENT DOCUMENTS

DE    102008019372 A1    10/2009

OTHER PUBLICATIONS

European Search Report for Application No. 20207815.0 dated Apr. 12, 2021, 9 pages.

*Primary Examiner* — Justin M Benedik
(74) *Attorney, Agent, or Firm* — CANTOR COLBURN LLP (57) ABSTRACT

An assembly and a method for manufacturing an assembly for transmitting torque to an aircraft actuator. The assembly and method include a torque tube having a longitudinal axis and an end fitting. The ending fitting includes a connector portion and an engagement portion that is inserted into the torque tube. The engagement portion includes a first end adjacent the connector portion, a second end opposite the first end, and a coupling region between the first and second end that includes an outer coupling surface having an outer diameter and a continuous groove formed thereon. The continuous groove includes two axial grooves that extend along the outer coupling surface along the longitudinal axis and a first parallel groove that extends circumferentially about the longitudinal axis along the outer coupling surface that joins the two axial grooves.

12 Claims, 7 Drawing Sheets

(52) U.S. Cl.
CPC ............... *F16D 2001/103* (2013.01); *F16D 2500/5116* (2013.01); *F16L 2201/10* (2013.01)

(56) References Cited

U.S. PATENT DOCUMENTS

| | | | | |
|---|---|---|---|---|
| 4,930,204 | A | * | 6/1990 | Schurter ............. B29C 66/1222 29/469.5 |
| 5,836,070 | A | * | 11/1998 | Arena .................... B21D 26/14 29/523 |
| 5,855,053 | A | * | 1/1999 | Arena .................... B21D 39/04 29/523 |
| 5,983,478 | A | * | 11/1999 | Dolan .................... B21D 39/04 29/516 |
| 8,430,759 | B2 | * | 4/2013 | Wanthal .................. F16C 3/026 464/181 |
| 2016/0025146 | A1 | * | 1/2016 | Saha ....................... F16D 1/104 29/523 |

\* cited by examiner

AXIAL LOAD CAPABLE TORQUE TUBE ASSEMBLY AND MANUFACTURING METHODS THEREOF

DOMESTIC PRIORITY

This application claims the benefit of an earlier filing date from U.S. Provisional Application Ser. No. 62/935,903 filed Nov. 15, 2019, the entire disclosure of which is incorporated herein by reference.

BACKGROUND

Exemplary embodiments pertain to the art of power transmission assemblies and, in particular systems and methods for transmitting rotational forces with a torque tube assembly. The assembly can be used, for example, to transmit forces to devices that are used to move controls surface of an aircraft such as ailerons, flaps, and slats of commercial aircrafts.

Modern aircraft often use a variety of aerodynamic surfaces (e.g., high lift leading and trailing edge devices such as slats and flaps) to improve angle of attack performance during various phases of flight, for example, takeoff and landing. Such surfaces can be controlled by a control unit that causes a main drive unit to produce rotation of a shaft or "torque tube". In general, torque tubes may be used in an aircraft for transmitting torsional forces to devices that cause movement of aerodynamic controls surfaces, such as ailerons, slats and flaps.

In general, torque tube assemblies consist of an aluminum tube joined to an end fitting by means of riveting or similar mechanical joining methods. During the manufacturing process of such assemblies, end fittings having angular ridges are inserted into the ends of the torque tube. The ends of the torque tube are then conformed to the end fitting to form complementary geometric features. When a torque tube is conformed to an end fitting configured as described above, the walls of the tube may become susceptible to cracking. These cracks can reduce expected life of the tube and adjoining parts.

Recent aircraft applications incorporate thin wing designs to decrease aerodynamic drag and thereby increasing the aircraft efficiency. The thin wing design results in significant wing bending/defections under normal operating conditions. As will be understood, in general, a torque tube that extends outward from the body of an aircraft along such wings will thus be exposed to axial compression and axial extensions on the diametrically opposed sides thereon. Either type of force (compression or extension) can be referred to as an axial force herein.

BRIEF DESCRIPTION

According to one embodiment of the present disclosure there is an assembly for transmitting torque to an aircraft actuator. The assembly comprises a torque tube having a longitudinal axis and an end fitting. The ending fitting includes a connector portion and an engagement portion that is inserted into the torque tube. The engagement portion comprises a first end adjacent the connector portion, a second end opposite the first end, and a coupling region between the first and second end that includes an outer coupling surface having an outer diameter and a continuous groove formed thereon. The continuous groove includes two axial grooves that extend along the outer coupling surface along the longitudinal axis and a first parallel groove that extends circumferentially about the longitudinal axis along the outer coupling surface that joins the two axial grooves.

In addition to one or more of the features described above, or as an alternative, in further embodiments of the assembly the connector portion is connected to a power drive unit.

In addition to one or more of the features described above, or as an alternative, the parallel groove is at least one half the length of the two axial grooves.

In addition to one or more of the features described above, or as an alternative, further embodiments of the assembly may include a third axial groove and a second parallel groove that connects one of the two axial grooves to the third axial groove.

In addition to one or more of the features described above, or as an alternative, further embodiments of the assembly may have the first parallel groove at a first end of the end fitting and the second parallel groove at a second end of the end fitting.

In addition to one or more of the features described above, or as an alternative, in further embodiments of the assembly the continuous groove has a depth in a range of 0.05 mm to ½ the outer diameter of the coupling surface.

In addition to one or more of the features described above, or as an alternative, in further embodiments of the assembly the continuous groove has a cross-section shape that is concave relative to the outer coupling surface.

In addition to one or more of the features described above, or as an alternative, in further embodiments of the assembly the end fitting is formed stainless steel.

In addition to one or more of the features described above, or as an alternative, in further embodiments of the assembly the outer coupling surface is machined to form the continuous groove.

In addition to one or more of the features described above, or as an alternative, in further embodiments of the assembly the end fitting includes an anti-corrosion surface treatment deposited thereon.

In addition to one or more of the features described above, the torque tube is aluminum or titanium.

In addition to one or more of the features described above, or as an alternative, in further embodiments of the assembly an anti-corrosion surface treatment is deposited on the torque tube.

According to another embodiment of the present disclosure there is a method for manufacturing an assembly for transmitting torque to an aircraft actuator. The method comprises: forming an end fitting, wherein the end fitting includes a connector portion and an engagement portion. In this embodiment, the engagement portion includes a first end adjacent the connector portion, a second end opposite the first end, and a coupling surface between the first and second end. The method also includes: creating a continuous groove on the engagement portion such that it includes two axial grooves that extend along a longitudinal axis of the end fitting, a first parallel groove that extends circumferentially about the longitudinal axis, and joins the two axial grooves; inserting the second end of the end fitting into a torque tube; and electromagnetically forming the torque tube to the outer coupling surface of the engagement portion.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As discussed in general terms above, wing bending deflections can lead to an increase in axial loads on torque tube assemblies used to provide torque to assemblies that control aerodynamic surfaces of an aircraft.

Disclosed herein is a torque tube assembly that may solve or reduce one or more of the above discussed issues and, in particular, is adapted to operate in situations where portions of a torque tube assembly are subjected to axial loading. In one embodiment, such loading can occur in a location of the torque tube assembly where a torque tube is joined to an end fitting. The end fitting can be sized and adapted such that it can connect to an actuator to drive, for example, a flight control or other aerodynamic surface of an aircraft. This can be accomplished, in one embodiment, by providing an engagement portion of the end fitting that is inserted into the torque tube with a coupling region that includes an outer coupling surface having an outer diameter and having a continuous groove formed thereon. The groove will include axially extending grooves that are joined to one another by one or more parallel grooves that extend circumferentially about an outer coupling surface. The axially extending grooves will provide for good rotational torque transfer while the parallel groove(s) allow the connection to withstand axial forces/loading.

The length of parallel groove(s) can be selected (relative to the axially extending grooves) so that in the presence of axial forces, the torque tube and the end fitting can remain in a relatively fixed relationship to one another. As will be more fully understood, after insertion of such an end fitting into a torque tube, the torque tube is electromagnetic formed to the end fitting.

Figure 1:
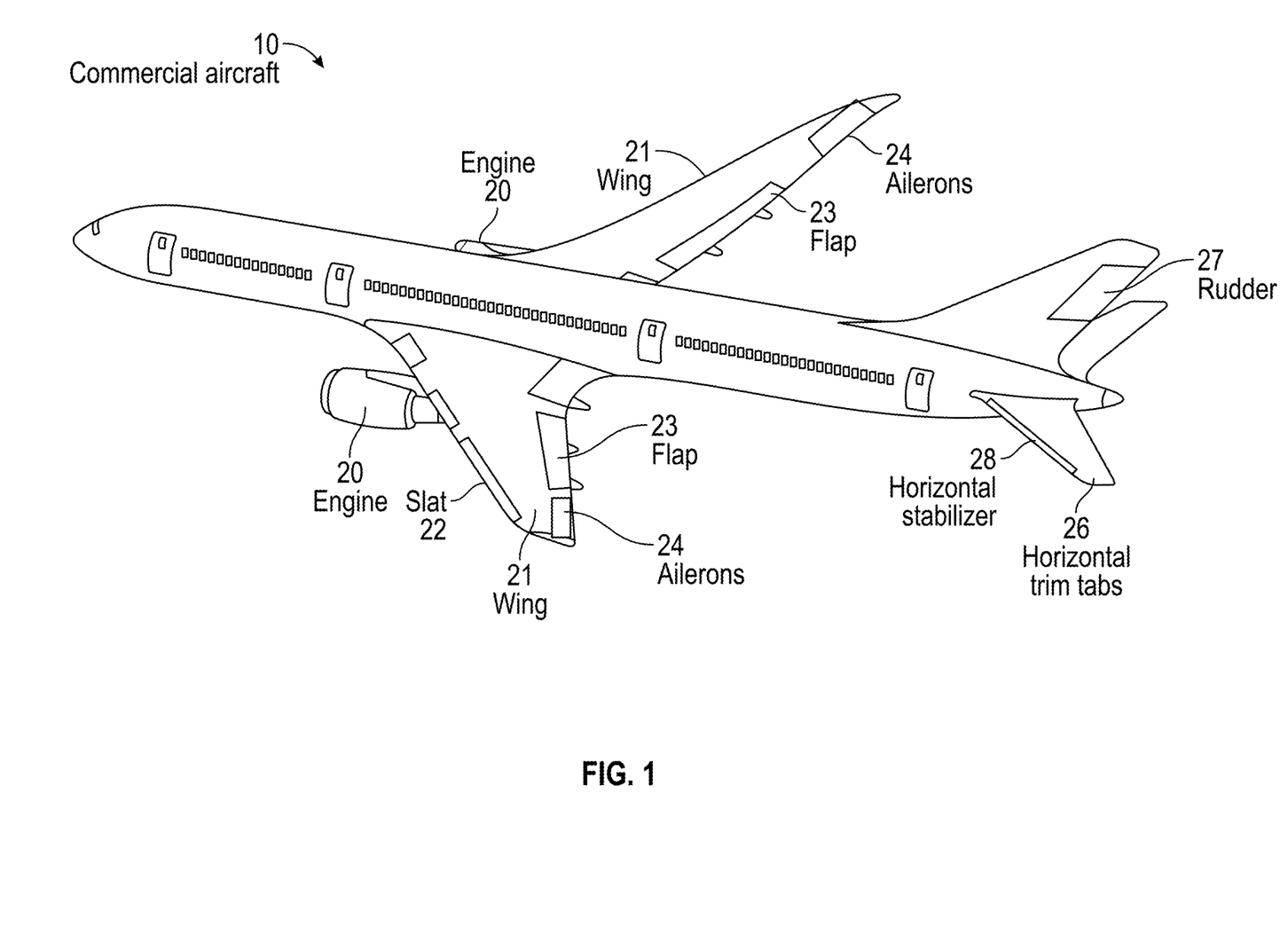
FIG. 1 is an example of an aircraft on which embodiments disclosed herein can be implemented.

FIG. 1 illustrates an example of an aircraft 10 that is suitable for use with embodiments disclosed herein. The aircraft 10 is shown as a commercial aircraft but that is not as limiting. The illustrated aircraft 10 includes aircraft engines 20 used to generate lift to enable the aircraft to fly. The engines 20 can also generate rotational motion that can be transferred to other portions of the aircraft 10 via torque transfer assemblies as disclosed herein. The illustrated aircraft 10 includes two wings 21 and many aerodynamic control surfaces (simply "control surfaces") that affect how the aircraft 10 flies. Examples of such control surfaces include, but are not limited to, one or more slats 22 and one or more flaps 23. The aircraft 10 can also include other control surfaces such as ailerons 24, spoilers 25, horizontal stabilizer trim tabs 26, rudder 27 and horizontal stabilizers 28. In one embodiment, the assembly disclosed herein is used to transfer torque to an actuator that controls the position of any of the above described control surfaces. The term "control surface" used herein includes but is not limited the above described control surfaces.

Figure 2:
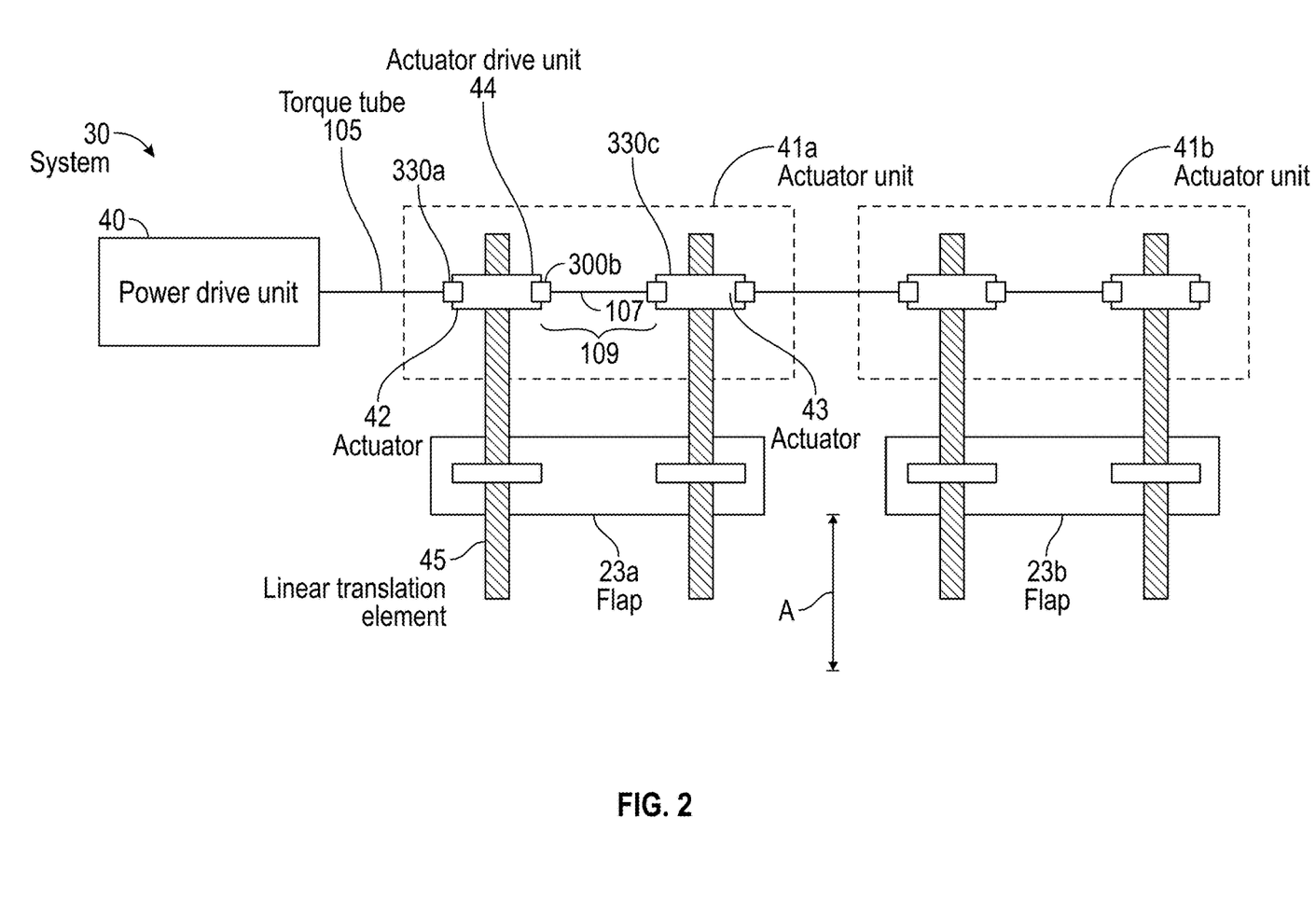
FIG. 2 is an example configuration an aircraft aerodynamic surface control system that includes a power drive unit connected to a drive assembly (actuator) by a torque transmission assembly according to one embodiment.

FIG. 2 illustrates, generally, a system 30 that can control and monitor the location of one or more control surfaces of an aircraft. As illustrated, the control surfaces are flaps 23. In particular, two flaps 23a, 23b are illustrated but any number of flaps could be controlled by the system 30. Further, while flaps 23 are illustrated, the same teachings herein can also be applied to slats 22 or the other control surfaces as shown in FIG. 1.

The system 30 includes a power drive unit 40 (drive unit). The drive unit 40 can cause a rotation of a torque tube 105 in order to move one or more of the flaps 23 in either direction in or out as generally indicated by arrow A. To convert the rotary motion of the torque tube 105 into linear motion to move the flaps 23, one or more actuator units 41a . . . 41b are provided, with each flap or other control surface having its own actuator unit 41.

In the example shown in FIG. 2, each actuator unit 41a, 41b includes two actuators. However, this is only by way of example and is not required. Each unit could include only one actuator or more than two actuators. In the illustrated, non-limiting example, a first actuator unit 41a includes first and second actuators 42, 43. The first actuator 42 includes an actuator drive unit 44 and a linear translation element 45. While not specifically denoted, the second actuator 43 an include the same or similar elements. Power is transmitted from the power drive unit 40 to the first actuator drive unit 44 via the main torque tube 105. A first end piece 300a is connected to and coupled with the torque tube 105. As more fully described below, the first end piece 300a can include an engagement portion that includes a continuous groove formed on it so that when joined to the torque tube, the assembly of the two elements can accommodate axial forces/loads. The first end piece 300a can be sized such that it can connect to the first actuator 42.

The first actuator 42 can be connected to the second actuator 43 by a second or connecting torque tube 107. To enable connection to both the first and second actuators, the connecting torque tube 107 can include two end pieces on opposing ends thereof. Thus, in one embodiment there is provided an assembly that includes one torque tube and two end pieces where at least one of (and possibly both) include a continuous groove having both axial and parallel grooves as described herein. As illustrated in FIG. 2, such an assembly is shown as connecting assembly 109 and includes the second and third end pieces 300b/300c and the connecting torque tube 107.

The actuator drive unit 44 receives rotary motion from the torque tube 105 and causes the linear translation element 45 to move linearly in the direction shown generally by arrow A. The second actuator 43 operates in a similar manner and receives rotary motion via the connecting assembly 109. In one embodiment, the linear translation unit 45 is a ball screw. In another, it may be hydraulic or rotary actuators or any other type of electromechanical actuators.

Figure 3:
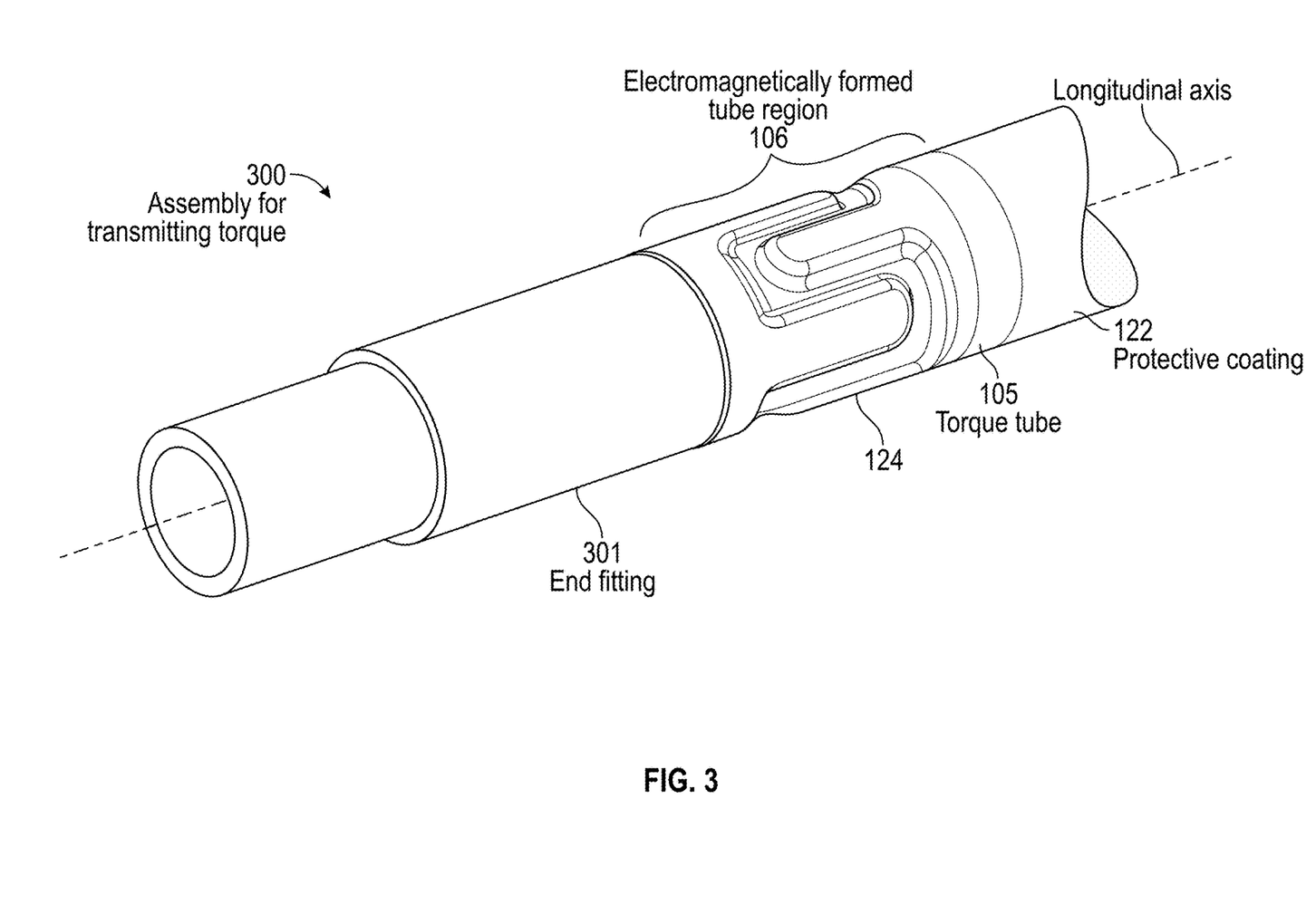
FIG. 3 shows an assembled view of an example torque transmission assembly.

FIG. 3 illustrates an assembly 300 for transmitting force, and in one embodiment, transmitting force to an aircraft actuator. The assembly 300 includes an end fitting 301. The assembly 300 further includes a torque tube 105 connected to the end fitting 301. As so arranged, the assembly has a longitudinal axis A.

The torque tube 105 can be any type of tube and as shown surrounds a portion of the end fitting 301. A typical torque tube is hallow and has an elongated shape. The torque tube 105 can be made from aluminum in one embodiment. The torque tube 105 may be made of other materials such as stainless steel, titanium, and/or other similar and conductive materials. Furthermore, the torque tube 105 may be coated with a protective coating shown by item 122 to protect against galvanic corrosion or other types of wear.

As further described below, a portion of the end fitting 301 is inserted into the torque tube 105 to form the assembly 300. As shown, the torque tube 105 is formed, crimped, fastened and/or coupled to a portion of the end fitting 301. This can be accomplished by utilizing an electromagnetic forming process in one embodiment. In general, such a process is a non-contact forming technique where a pulsed magnetic field is used to induce a current in the torque tube and a corresponding magnetic field rapidly expels a portion of a tube into contact with the end fitting that has the continuous groove formed therein. This provides for a strong interface between the tube and the end fitting. In particular, it can provide for an intimate connection between the torque tube 105 and the continuous groove so that the torque tube 105 will have a portion that is forced into the groove and, thus, have a version of the groove formed on its outer surface as is illustrated in FIG. 3 and reference by reference number 124.

In one embodiment the end fitting 301 defines the shape of the electromagnetically formed tube region 106. As shown, the electromagnetically formed tube region 106 surrounds a portion of the end fitting 301 in such a manner that it has enhanced capabilities for transmitting both axial and torsional loads generated by a power drive unit transmitting force to an aircraft actuator.

Figure 4:
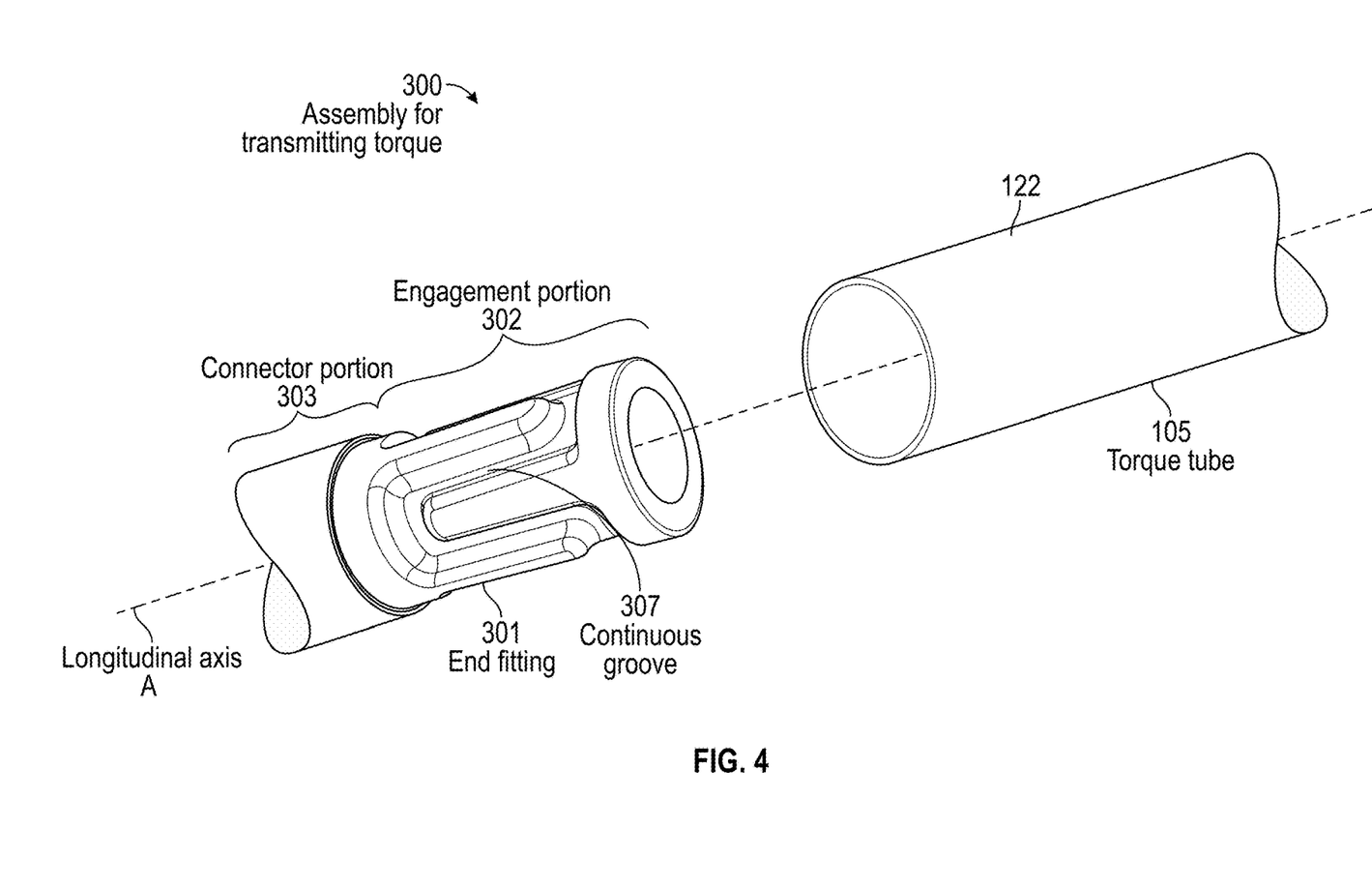
FIG. 4 shows an exploded view of the torque transmission assembly of FIG. 3.

FIG. 4 illustrates an assembly 300 for transmitting force to aircraft actuator prior to insertion of a portion of the end fitting 301 into the torque tube 105. The end fitting 301 comprises an engagement portion 302 and a connector portion 303. The end fitting 301 can be made from stainless steel in one embodiment. Of course, the tubular end fitting 301 may be made of other materials such as aluminum, titanium, and/or other similar materials. Furthermore, the end fitting 301 may be coated with a protective coating 122 as described above.

As further described below, the engagement portion 302 has a continuous groove 307 formed thereon. The connector portion 303 can be connected to a power drive unit 40. Also, the connector portion 303 can receive or may comprise, for example, any type of connection element that allows the end fitting to mate another device. A universal joint is an example of such a device. For example, a universal joint may be but is not limited to Cardan joints, Spicer joints or Hooke joints.

Figure 5:
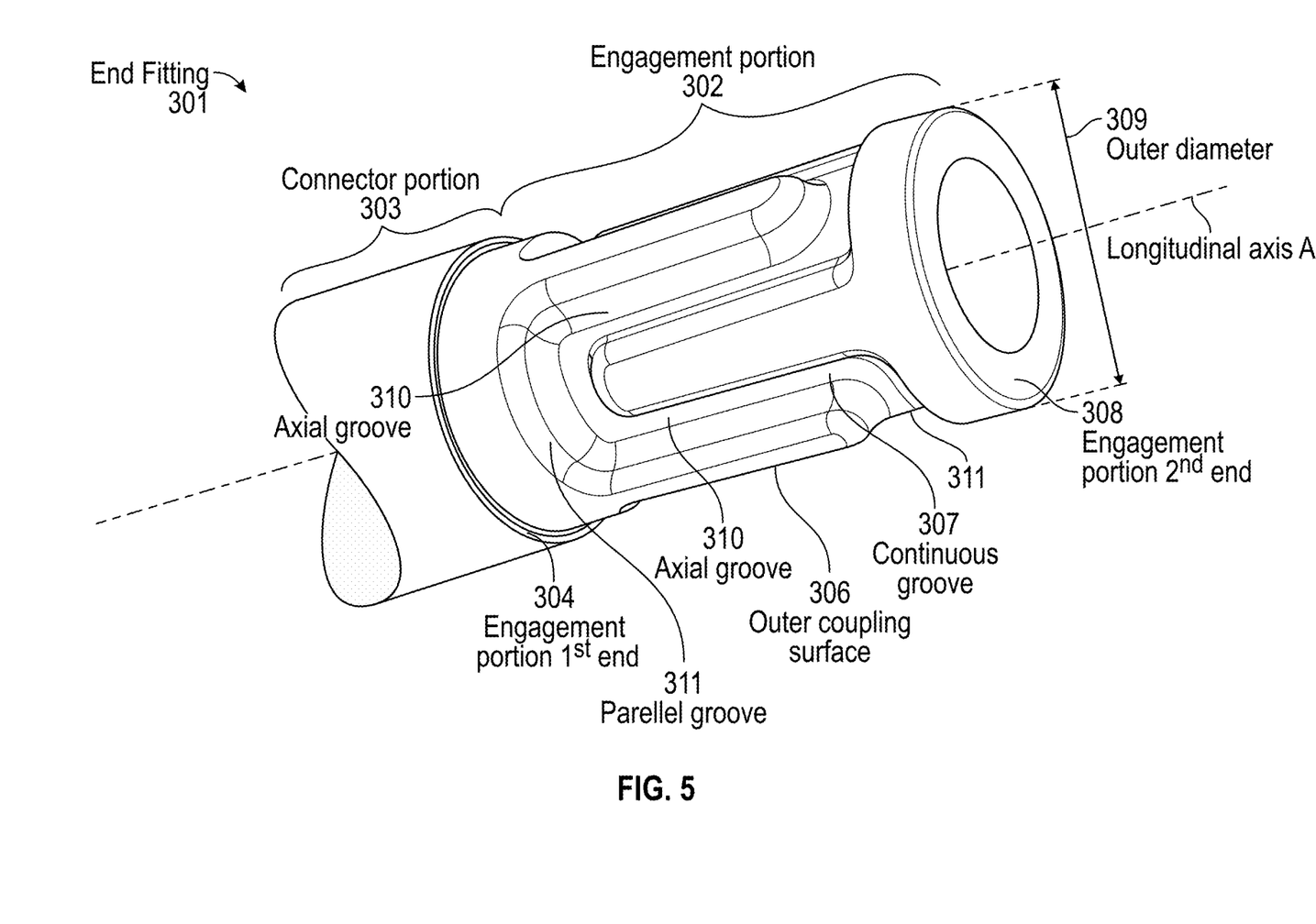
FIG. 5 is a more detailed view of the end fitting shown in FIG. 4.

FIG. 5 illustrates a detail version of the engagement portion 302 of an example end fitting 301. The end fitting 301 has a first end 304 adjacent to the connector portion 303 and a second end 308 opposite the first end 304 of the engagement portion 302. Also, the engagement portion 302 includes an outer coupling surface 306 between the first end 304 and second end 308. In addition, the outer coupling surface 306 extends generally between the first and second ends 304, 308 and has a continuous groove 307 that is formed on the outer coupling surface 306.

The continuous groove 307 includes both axial grooves 310 and parallel grooves 311. The axial grooves 310 extend generally along the longitudinal axis A and the parallel grooves 111 extends circumferentially about longitudinal axis A. In one embodiment, the parallel grooves 111 are approximately perpendicular to the axial grooves 110.

In general, the continuous groove 307 is formed thereon the engagement portion 302 between the first end 304 and the second end 308. The continuous groove 307 can be machined into the engagement portion 302 to produce the desired dimensions. In one embodiment, and as best seen in FIG. 6A, the length of the parallel groove (1p) is at least one half the length (1a) of the two axial grooves.

The engagement portion 302 with the continuous groove 307 of the present invention has improved torque distribution. This may reduce the possibilities of stress cracks and over fatigue in assembly 300. Furthermore, the continuous groove 307 formed on the outer coupling surface 306 of the engagement portion 302 with a plurality axial grooves 310 and parallel grooves 311 may allow for better axial load handling.

Figure 6A:
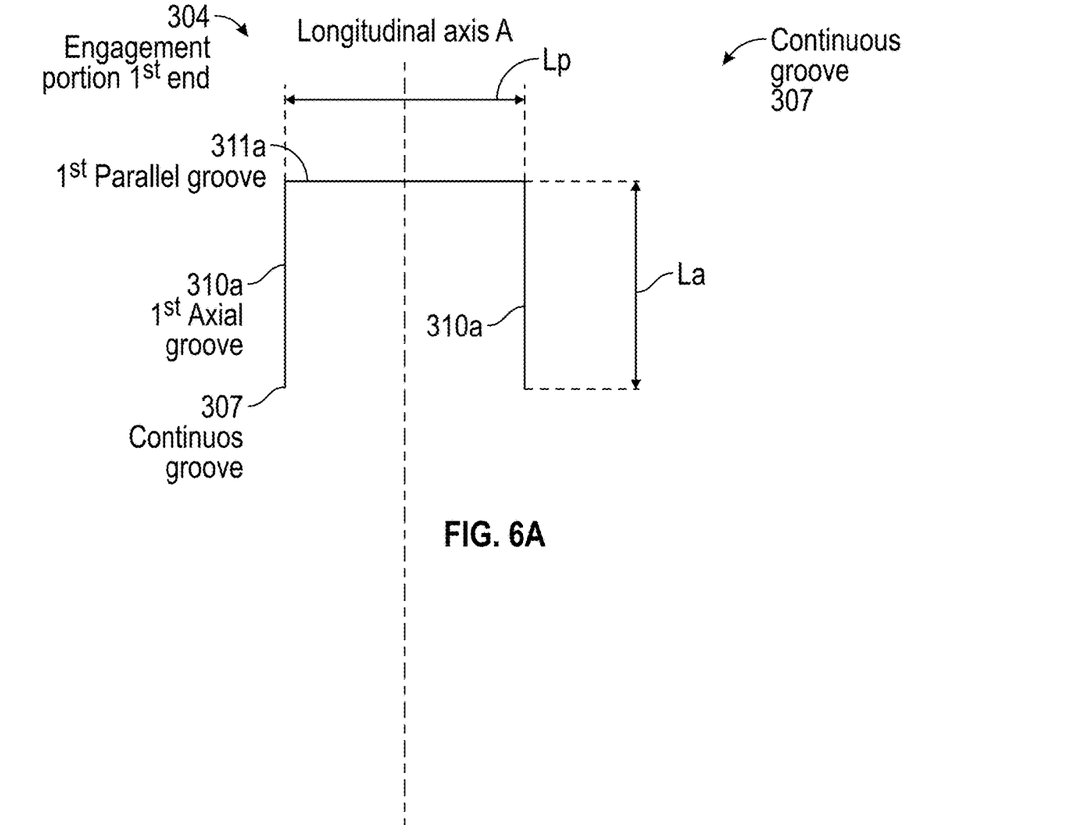
FIGS. 6A-6B are plan views of examples illustrating different continuous groove embodiments can extend along a longitudinal axis and circumferentially about the end fitting according at least one embodiment.
Figure 6B:
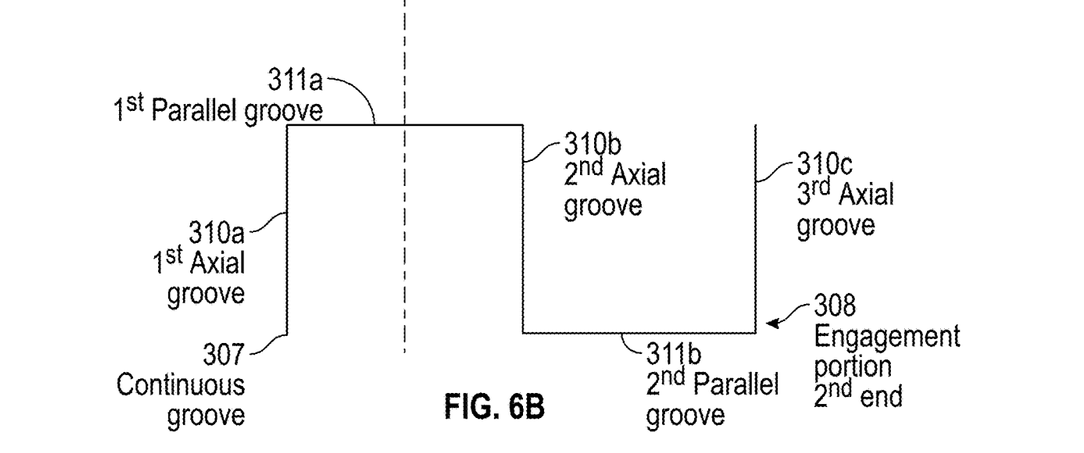

FIGS. 6A-6B illustrate a continuous groove 307 about longitudinal axis A. The continuous groove 307 in FIG. 6A includes at least two axial grooves 310a and 310b that extend along the longitudinal axis A and joins a first parallel groove 311a that extends circumferentially about the longitudinal axis A.

In addition to the improvements discussed above, the continuous groove 307 may result in an assembly 300 that may better withstand axial loading and, thus, extend the life expectancy of assembly 300 and reduces cost. In particular, the parallel grooves can counter such axial loading.

FIG. 6B is another example of a continuous groove 307 about longitudinal axis A. The continuous groove 307 in FIG. 6B can be a continuation of 6A or can be viewed independently. The continuous groove 307 in FIG. 6B includes at least three axial grooves 310a, 310b, and 310c that extend along the outer coupling surface about the longitudinal axis A and join at least two parallel grooves 311a and 311b that extends circumferentially about the longitudinal axis A along the outer coupling surface. Axial grooves 310a and 310b are joined by parallel groove 311a. Similarly, axial grooves 310b and 310c are joined by parallel groove 311b. Furthermore, parallel groove 311a can be at the first end of the engagement portion 304 and parallel groove 311b can be at the second end of the engagement portion 308 as shown.

As discussed above, in one embodiment, the parallel grooves 311 are at least half as long as the axial grooves 310. This may improve the ability to operate in the presence of axial loads. For example, in FIG. 6A the axial grooves 310 formed thereon the outer coupling surface 306 of the engagement portion 302 are equal in length to the parallel groove 311.

Figure 7:
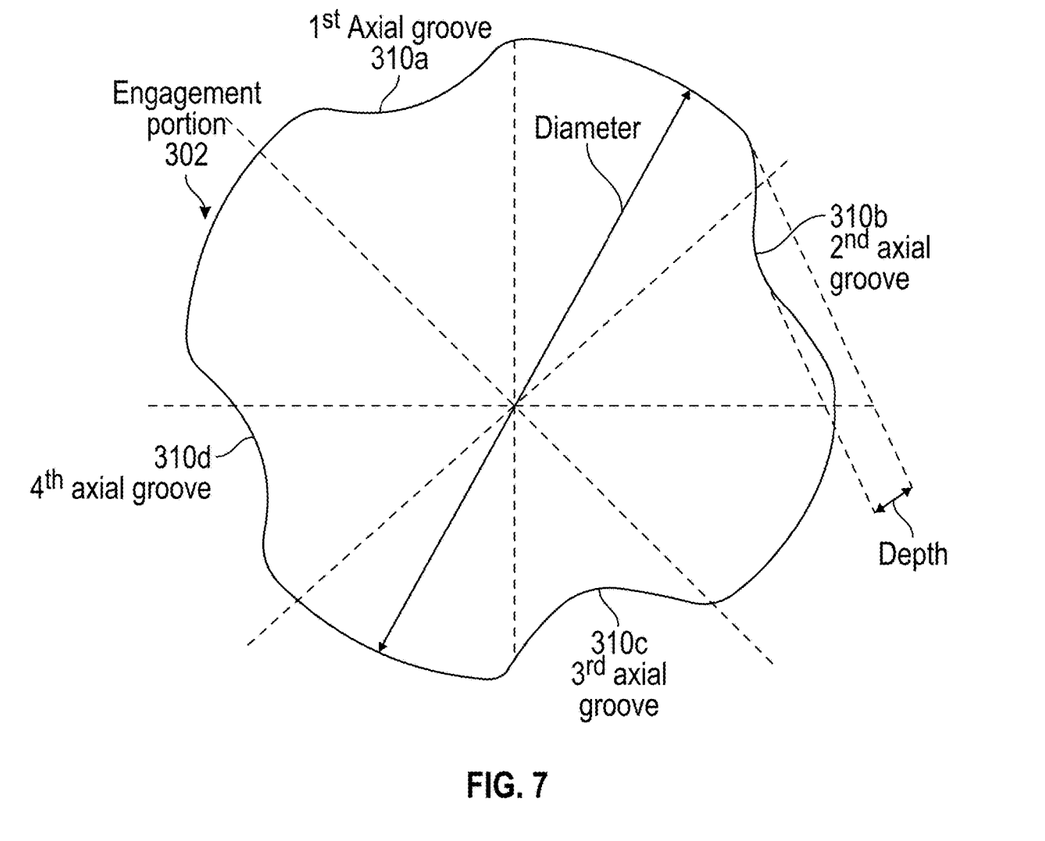
FIG. 7 is an example of a cross-section view taken through the engagement portion of the end fitting.

FIG. 7 is a cross-section of the engagement region 302 of FIG. 5 taken along line 7-7. As shown, the engagement region 302 includes a first axial groove 310a, a second axial groove 310b, a third axial groove 310c, and a fourth axial groove 310d. While not shown in FIG. 7, it shall be understood parallel grooves 311 may connected adjacent to the axial grooves 310.

Parallel grooves 311 alternate the engagement portion first end 304 and the engagement portion second end 308.

Furthermore, the continuous groove 307 which extends circumferentially about longitudinal axis A is a concave shape. Concave describes any shape that curves inward. The continuous groove 307 may be any concave or convex geometric shape without departing from the scope of the present invention. The depth of a continuous groove 307 may range between 0.001 mm to one half the engagement portion 302 outer diameter 309. This results in improved fatigue resistance and high crack resistance of assembly 300.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An assembly for transmitting torque to an aircraft actuator comprising:
   a torque tube having a longitudinal axis;
   an end fitting comprising:
      a connector portion; and
      an engagement portion inserted into the torque tube, wherein the engagement portion includes:
         a first end adjacent the connector portion;
         a second end opposite the first end; and
         a coupling region between the first and second end that includes an outer coupling surface having an outer diameter and having a continuous groove formed thereon;
         wherein the continuous groove includes two axial grooves that extend along outer coupling surface along the longitudinal axis and a first parallel groove that extends circumferentially about the longitudinal axis along the outer coupling surface and that joins the two axial grooves;
         wherein the continuous groove further includes a third axial groove and a second parallel groove, the second parallel groove connecting one of the two axial grooves to the third axial groove;
         wherein the first parallel groove is at the first end and the second parallel groove is at the second end.

2. The assembly of claim 1, wherein the connector portion is connected to a power drive unit.

3. The assembly of claim 1, wherein the parallel groove is at least one half the length of at least one of the two axial grooves.

4. The assembly of claim 1, wherein a depth of the continuous groove is in a range of 0.05 mm to ½ the outer diameter of the coupling surface.

5. The assembly of claim 4, wherein the continuous groove has a concave shape relative to the outer coupling surface.

6. The assembly of claim 5, wherein the end fitting is formed of stainless steel.

7. The assembly of claim 6, wherein the end fitting has the outer coupling surface is machined to form the continuous groove.

8. The assembly of claim 7, wherein the end fitting includes an anti-corrosion surface treatment deposited thereon.

9. The assembly of claim 8, wherein the torque tube includes aluminum.

10. The assembly of claim 1, wherein the torque tube includes titanium.

11. The assembly of claim 10, wherein the torque tube includes an anti-corrosion surface treatment deposited thereon.

12. A method for manufacturing an assembly for transmitting torque to an aircraft actuator, the method comprising:
   forming an end fitting such that the fitting includes: a connector portion; an engagement portion; a first end adjacent the connector portion: a second end opposite the first end; and an outer coupling surface between the first and second end;
   creating a continuous groove on the engagement portion such that it includes two axial grooves that extend along a longitudinal axis of the end fitting and a first parallel groove that extends circumferentially about the longitudinal axis and joins the two axial grooves, wherein the continuous groove further includes a third axial groove and a second parallel groove, the second parallel groove connecting one of the two axial grooves to the third axial groove and the first parallel groove is at the first end and the second parallel groove is at the second end;
   inserting the second end of the end fitting into a torque tube; and
   electromagnetically forming the torque tube to the outer coupling surface of the engagement portion.

* * * * *